Patented Apr. 20, 1926.

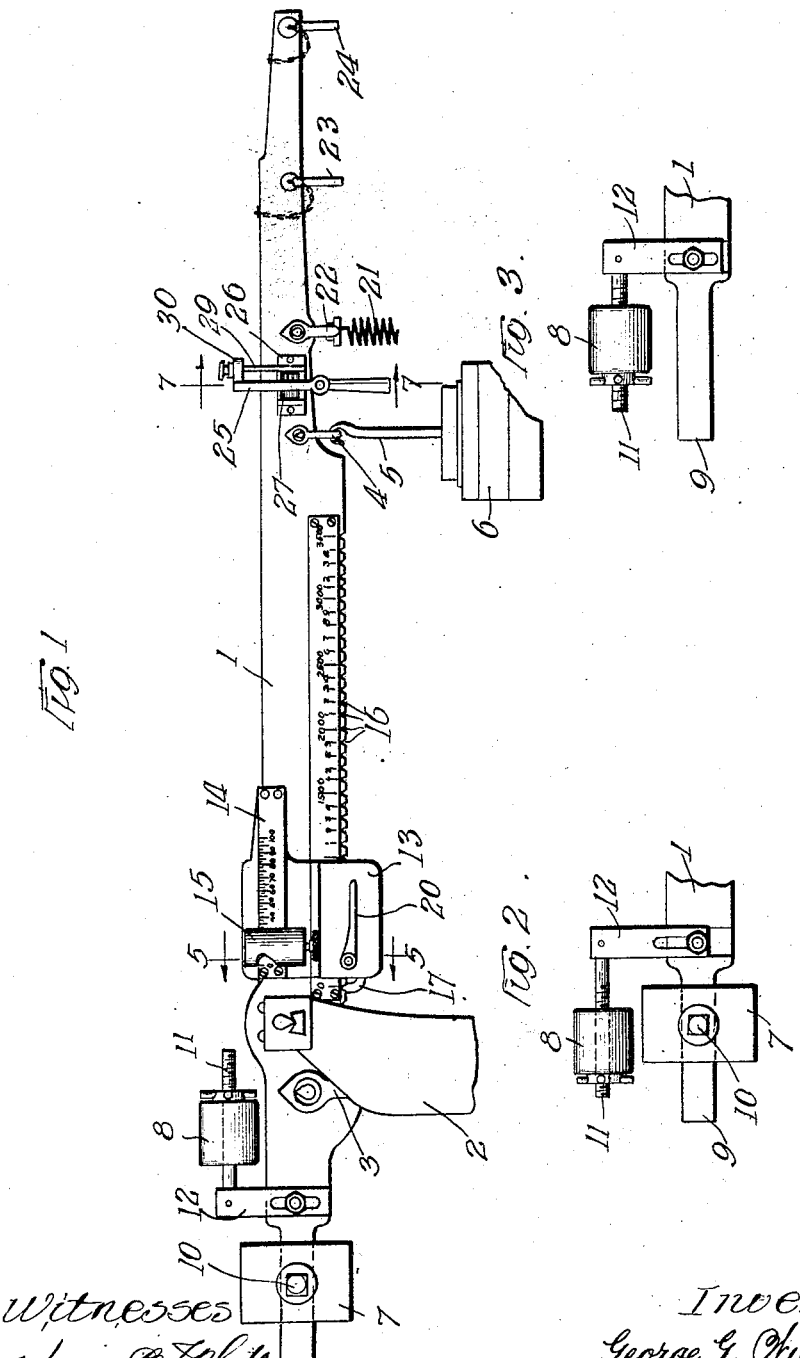

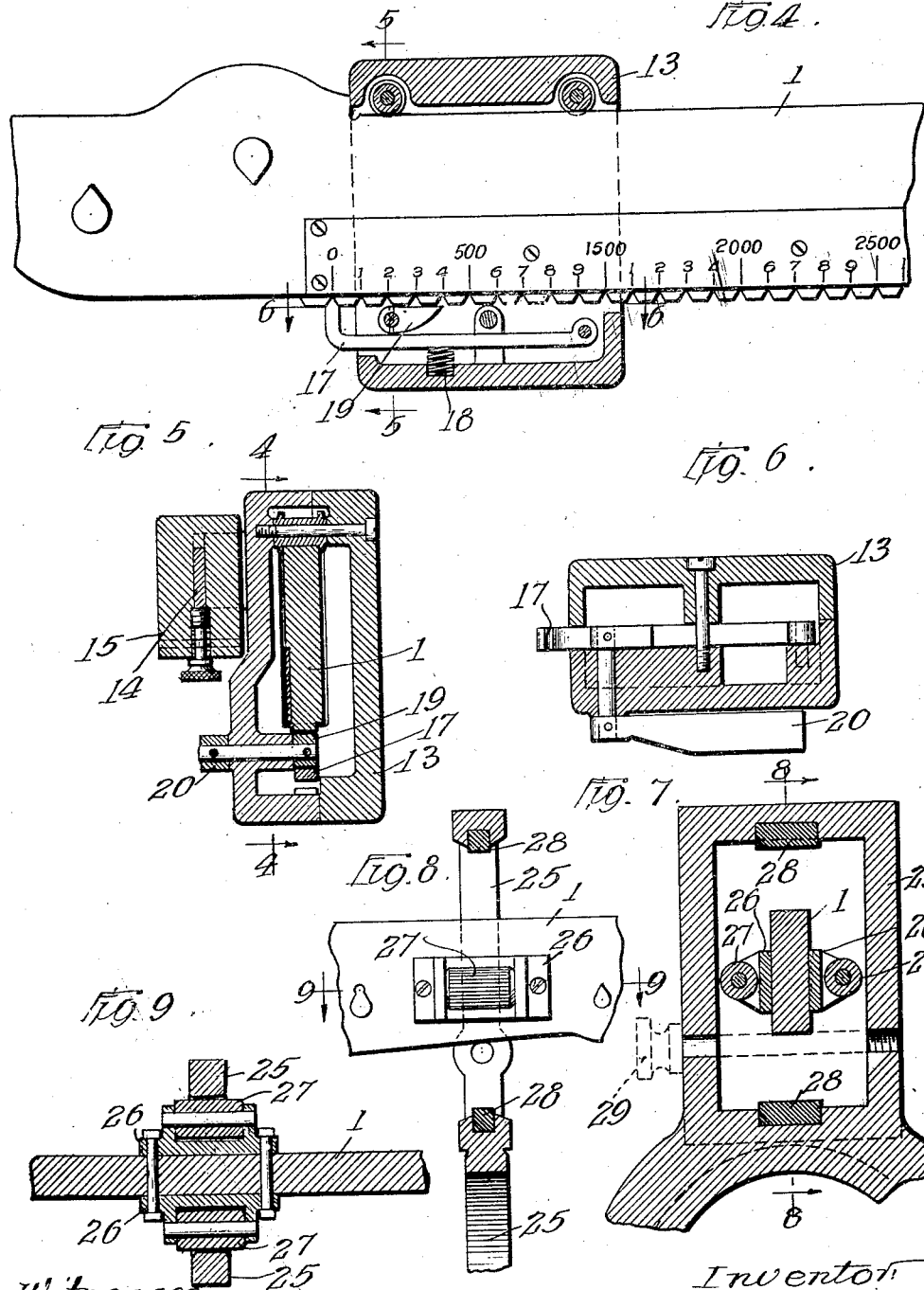

1,581,768

UNITED STATES PATENT OFFICE.

GEORGE G. WILEY, OF CHICAGO, ILLINOIS, ASSIGNOR TO STREETER-AMET WEIGHING & RECORDING COMPANY, OF CHICAGO, ILLINOIS, A CORPORATION OF ILLINOIS.

SCALE BEAM.

Application filed December 19, 1923. Serial No. 681,536.

*To all whom it may concern:*

Be it known that I, GEORGE G. WILEY, a citizen of the United States, residing at Chicago, in the county of Cook and State of Illinois, have invented certain new and useful Improvements in Scale Beams, of which the following is a specification.

This invention relates to scale-beams for weighing scales and more particularly to that class of weighing scales employed to weigh car contents at coal and other mines wherein the tare is practically uniform at all times, because of similarity of car-weights.

The main objects of the invention are to provide a scale-beam which is provided with counter-balancing devices permitting of a very wide range of accurate adjustments to compensate for a similar range of dead-weight, such as that of the scale-platform.

A further object of the invention is to provide means for adjusting the scale-beam with respect to the initial tension of a balancing spring and wherein the latter may be at any time dissociated from the beam and its place taken by gravity means, or wherein the spring may be used in connection with gravity means, to compensate for tare, and wherein an adjustable poise may be associated with the spring or gravity means or both, for the purpose of effecting very fine adjustments to equalize the tare with great accuracy, to provide simple and efficient means for accurately readjusting the scale-beam when necessary and to also provide means for locking the beam to prevent operation when desired and to prevent lateral swing of the beam when the scale is in operation.

The invention has for its further object to provide a poise and latching means therefor, whereby the same is adapted to be held in any desired position on the scale-beam and which is equipped with an auxiliary beam and poise adapted for effecting fine adjustment.

A further important object of the invention is to provide a weighing-scale of the recording type which is adapted to be quickly and easily converted into what is known as a "free-beam" scale adapted for hand weighing in event that the recording mechanism is out of order, or for other reasons, including that of readjustments or checking of accuracy.

Other objects and advantages of the invention will be emphasized in the following specification.

The preferred embodiment of the invention is illustrated in the accompanying drawings, wherein:

Fig. 1 is a view in side elevation of a scale-beam constructed in accordance with the invention, together with fragments of rigid and other elements of a weighing scale.

Figs. 2 and 3 are fragmentary detail side elevations of counterbalancing means employed, showing the various positions thereof different from those shown in Fig. 1.

Fig. 4 is a fragmentary detail side elevation of the scale-beam showing the poise thereof in vertical section, this view being on the line 4—4 of Fig. 5.

Fig. 5 is a vertical transverse section on the line 5—5 of Fig. 4.

Fig. 6 is a horizontal section on the line 6—6 of Fig. 4.

Fig. 7 is a vertical section on the line 7—7 of Fig. 1.

Fig. 8 is a section on the line 8—8 of Fig. 7.

Fig. 9 is a plan section on the line 9—9 of Fig. 8.

The beam of this invention is adapted for use as a "free beam" for hand weighing and as a "controlled beam" for use in connection with weight-recording mechanism. By a "free" beam is meant that the beam is adapted for hand weighing in case the recording mechanism is temporarily out of order, or when the scale is being completely tested and readjusted without the recording mechanism. A "controlled" beam means that the beam is connected to the recording mechanism and is controlled by the recorder-spring and dash-pot.

In the instance illustrated the beam 1, having a graduated end portion and a tail-end portion, is pivotally supported between said portions upon the rigid support or standard 2, and is pivotally connected at its tail-end portion, with the dead-load rod 3 which carries the scale-platform (not shown).

The graduated end portion of the beam 1 is equipped with a loop 4 for hanging thereon a weight-rod 5 adapted to support weights, and is further equipped with means for connecting the same with a tension spring, a type-wheel and a dash-pot, as hereinafter fully described.

On the tail portion 9 of the beam 1 there is slidably mounted, a weight 7 equipped with a set-screw 10, and adjacent to said tail portion there is set in a groove in the beam, a vertically disposed slotted post 12 which is vertically adjustable and may be removed and reversed as to the face opposed to the bottom of said groove, to thereby cause the threaded shank 11 to extend either in the direction shown in Fig. 1, or in that shown in Figs. 2 and 3. On said shank 11 is an adjustable counterpoise 8, of ordinary construction, fitted with a lock-nut in the usual manner.

On the graduated end portion of the beam there is mounted a poise 13 which is adapted to be moved to register with any one of the major or fractional graduations of said beam 1, said major graduations being, in the instance illustrated, spaced to indicate weight-units of five cwt. each and the fractional graduations one cwt. each, any divisions or multiples of said specific units being used according to the capacity of the scale and the particular purposes for which it is adapted. An auxiliary graduated beam 14 on the poise 13 and on which the poise 15 is adapted to indicate, is used to indicate small fractions of the fractional graduations of the beam 1. Each of the latter is associated with a notch 16 in the beam 1 in which the end of the spring-held lever 17 is adapted to engage to hold the poise 13 firmly at any desired point between the ends of the beam 1. The spring 18 bears upon the lever 17, the latter being adapted to be released from engagement with a notch 16 by means of the pivoted cam-element 19 rigidly associated with the hand-lever 20.

The beam is primarily adjusted as a "free beam" and the poise 13 and auxiliary poise 15 are then moved to their respective "zero" indicating positions. The rod 5 is hung in loop 4. The type-wheel connection or "rack-rod" and the dash-pot rod are not hung on loops 23 and 24, and the spring 21 is not then connected with the loop 22.

Weights 6, each of which is adapted to exert a pull on the beam 1 equal to a major unit load on the platform, are then mounted on the rod in number to exceed the dead-load pull by an amount approximately equal to the intended initial tension of the spring 21 which is secured at its other end to a fixed element (not shown).

The counter-poises 7 and 8 are now adjusted, either individually or together to counter-balance the combined pull of the several load-elements on the graduated end-portion of the beam 1. The rack-rod and dash-pot rod are then dissociated from the loops 23 and 24 and a tension-weight mounted on the rod 5 which exerts exactly the same pull as said spring 21, the rack-rod and the dash-pot rod.

The graduations of the beam 1 and auxiliary beam 14 are then fixed by means of test-weights on the platform or equivalent means, whereupon the scale is ready for use as a "free-beam" scale.

To now convert into a "controlled beam", the elements 23 and 24 and the spring 21 are connected with the beam and all weights on the rod 5 (or said rod and weights) are removed as said connections exert exactly the same pull as did said weights or weights and rod 5, as the case may be.

The swing of the beam 1 from its lowest or normal position with no load on the platform, to its highest or maximum load position under similar load on the platform is substantially equal to the pitch-circumference of the pinion of the type-wheel constituting a part of the recording mechanism of the scale and which is fully illustrated and described in my co-pending application for patent filed the 19th day of December, 1923, Serial No. 681,540.

The scale is, however, not intended for the ordinary uses of weighing widely varying successive live loads, but for that class of scales used particularly for weighing coal brought up from mines, as an exemplary function, on trains of cars each of which is of approximately the same weight and is readable as "tare". These cars are usually weighed successively during travel over the scale-platform.

To accord only the net weight of the live load in the car, the poise 13 is adjusted on the beam 1 to the fixed point where, either alone or by addition of fractional weight indicated on the auxiliary beam 14, the load indication equals the "tare" weight of the cars. As the live-load passes over the platform, the weight in excess of the "tare" is recorded by means of a type-wheel and associated mechanism operatively connected with the beam 1 for actuation and control thereby, as hereinafter fully described.

A guide-frame 25 is rigidly supported on a frame element of the scale and through it the beam 1 projects, the latter being provided with the shoes 26 carrying the anti-friction rollers 27 normally out of contact with, but adapted to ride on the inner faces of the vertical walls of said frame under the influence of usual lateral swing of the beam 1 during operation, said frame being equipped with rubber cushions 28 in the path of the upper and lower edges of the beam 1. The latter is normally positioned to almost contact with the lower cushion 28 when the type-wheel registers zero on the dial usually associated therewith, unless the poises 13 and 15 are adjusted to balance the tare weight of platform load. In that case the beam 1 rests upon the lower cushion 28 and will swing upwardly only in response to platform load in excess of tare and thus turn the type-wheel to position to indicate and record only the net load on the platform. Under the influence of load in excess of the capacity of the scale, the beam will strike the upper cushion 28.

To reconvert the beam into a "free-beam", the spring 21 and the elements 23 and 24 are dissociated from the beam 1 and the rod 5 and weights 6 replaced, including the aforesaid "tension weight".

The beam may be locked against use by inserting the pin 29 through the frame 25 as shown in Fig. 7, said pin being normally supported upon the projection 30 at the top of the said frame, as shown in Fig. 1.

The auxiliary poise 15 may be secured against movement on the auxiliary beam 14 by means of the set-screw 31.

Lateral swinging of the beam 1 under the influence of sudden loading and unloading of the scale-platform is very detrimental to the pivots thereof, in that it effects wear thereon so that guiding said beam by means of said rollers 27 is very desirable.

From the foregoing it will be apparent that a wide range of operative possibilities and accurate adjustments are provided for, to adapt the scale for a multiplicity of uses, or to meet practically every condition to which the particular type of scale to which the invention is particularly applicable, is subject. It will be further observed that, while certain elements above particularly described, may not be related to others in the strict legal sense of true combination, they are so co-ordinated as to co-operate to the accomplishment of the results desired.

It will further be quite obvious that the particular embodiment of the invention shown and described, is capable of variation in details of construction as mechanical skill may dictate, without departing from the invention as defined in the appended claims.

I claim as my invention:

1. In a weighing scale a beam pivotally supported intermediate its ends and formed on one side rearwardly of its pivot with a vertical groove, an adjustable, vertically disposed slotted post mounted in said groove, extending above and slidably connected to the beam, a shank carried by and disposed at right angles to the upper portion of the post and capable of extending towards and from the pivot of the beam on the adjusting of the post, and a counter-poise carried by the stem.

2. In a weighing scale, a scale beam, a rigidly supported frame through which said beam extends, anti-friction rollers carried by the beam and normally out of contact with the side walls of the frame and capable of engaging said walls on the lateral swing of the beam, and cushioning means carried by the frame and arranged in the path of the upper and lower edges of the beam.

3. In a weighing scale, a scale beam, a rigidly supported frame through which said beam extends, anti-friction rollers carried by the beam and normally out of contact with the side walls of the frame and capable of engaging said walls on the lateral swing of the beam, cushioning means carried by the frame and arranged in the path of the upper and lower edges of the beam, and removable means extending transversely of the frame for locking the beam from use.

4. In a weighing scale, a scale beam, a rigidly supported frame through which extends said beam, oppositely extending shoes carried by the beam, and anti-friction rollers mounted in said shoes and normally out of contact with the side walls of the frame and capable of engaging said walls on the lateral swing of the beam.

5. In a weighing scale, a scale beam pivotally supported intermediate its ends, a counter-poise carried by the beam rearwardly of its pivot, a duplex counter-poise carried by the beam forwardly of its pivot, a counter-weight suspending means on said beam forwardly of the duplex counter-poise, and an independent tension element, rack rod and dash-pot rod coupling means arranged on said beam forwardly of said counter-weight suspending means.

6. In a weighing scale, a scale beam pivotally supported intermediate its ends, a counter-poise carried by the beam rearwardly of its pivot, a duplex counter-poise carried by the beam forwardly of its pivot, a counter-weight suspending means on said beam forwardly of the duplex counter-poise, an independent tension element, rack rod and dash-pot rod coupling means arranged on said beam forwardly of said counter-weight suspending means, and a counter-weight arranged on said beam rearwardly of the first mentioned counter-poise.

GEORGE G. WILEY.